Aug. 1, 1967     T. HEHENKAMP     3,334,291
SELF-GENERATING INVERTERS WITH SEMICONDUCTOR
CONTROLLED RECTIFIERS
Filed Sept. 16, 1964

INVENTOR.
THEODORUS HEHENKAMP
BY
*Frank R. Trifari*
AGENT

United States Patent Office 3,334,291
Patented Aug. 1, 1967

3,334,291
SELF-GENERATING INVERTERS WITH SEMI-
CONDUCTIVE CONTROLLED RECTIFIERS
Theodorus Hehenkamp, Eindhoven, Netherlands, assignor to North American Philips Company, Inc., New York, N.Y., a corporation of Delaware
Filed Sept. 16, 1964, Ser. No. 396,850
Claims priority, application Netherlands, Sept. 24, 1963, 298,336
24 Claims. (Cl. 321—44)

This invention pertains to self-generating inverters including at least one semiconductor controlled rectifier.

In one form of such inverters the main current circuit electrodes of the rectifier are coupled to the terminals of a D.C. supply source. A resonant circuit having series resonance properties is provided and one of the main current circuit electrodes is coupled to a supply source terminal through said resonant circuit. The capacitive part of the resonant circuit is coupled to a load circuit.

In accordance with copending application Ser. No. 171,867, filed Feb. 8, 1962, and now U.S. Patent No. 3,241,039, and assigned to the assignee of the instant application, a second resonant circuit is provided which is connected across the capacitive part of the above-mentioned resonant circuit. The rectifier is rendered periodically conducting by a pulse produced under the control of the current flowing in the second resonant circuit. In accordance with the disclosure in said copending application, the second resonant circuit is under-critically damped by at least one resistor; the second resonant circuit also includes a non-linear element which changes over from one polarization state to the opposite polarization state just after the zero passage of the current through, or the voltage across, one of the reactive elements of the second resonant circuit. The above-mentioned pulse is produced when the non-linear element changes polarization states. The switching frequency of the inverter is thus determined mainly by the values of the reactive and resistive elements of the second resonant circuit.

It is a particular object of this invention to improve the starting characteristics of an inverter of the above type.

It is another object of this invention to prevent the production of excessively high voltages which might damage the controlled rectifier. Such excessively high voltages are particularly likely to occur during the starting period and/or when the inverter is unloaded or partially loaded.

In one embodiment of the inverter of the above-mentioned copending application, the second resonant circuit includes a parallel resonant circuit and an additional reactive element, the parallel resonant circuit consisting of a capacitor and an inductor. The non-linear element is a control transformer having a core composed of saturable ferromagnetic material; the primary winding of this control transformer is connected in series with one of the reactive elements in the parallel resonant circuit while the additional reactive element is connected in series with the parallel resonant circuit. The secondary winding of the control transformer is coupled to the circuit between the cathode and the control electrode of the controlled rectifier.

With a given supply voltage and with a given load the amplitude of the output voltage of an inverter of this type increases with the operating frequency which, as stated above, is determined chiefly by the second resonant circuit. With zero load the output voltage is limited by the zero-load reactance of the first resonant circuit, usually formed mainly by the zero-load reactance of an output transformer, by means of which this resonant circuit can be coupled with the load. This resonant circuit determines the duration of each conducting period, so that its own frequency slightly exceeds the operating frequency of the inverter. It will therefore pass a considerably higher current and limit the zero-load voltage to a lower value when the operating frequency of the inverter is reduced.

Inverters are often switched on in the no-load state. This is particularly so when they are employed for applying current to loads which pass an appreciable current only after a considerable time delay and this only after the voltage applied thereto has exceeded an amplitude of a given value. An example of this is the ignition voltage applied to luminescent or other gas- or vapor-filled tubes.

The second resonant circuit must thus have a strong frequency-determining effect and must decrease the operating frequency at the start by, for example, about 20% in order to slow down the building up of the output voltage and to prevent the latter from reaching an inadmissibly high value before the inverter is loaded, for example, before the ignition of gas-discharge tubes fed from the inverter. At the start, the damping of the second resonant circuit must be small in order to promote the production of strong control-pulses.

In accordance with one aspect of the inverter of the present invention, the damping element of the second resonant circuit is a resistor having a value strongly dependent on its temperature, the resistor being included in the second resonant circuit in a manner such that it brings about a strong increase in the damping of the second resonant circuit and an increase in the operating frequency of the inverter with an increase in its temperature. An example of such a resistor is the filament of an incandescent lamp.

The additonal reactive element of the second resonant circuit may be an inductor or a capacitor. If it is an inductor, the damping element may be a resistor having a value which decreases when its temperature increases (a so-called negative temperature coefficient or NTC-resistor), the resistor being connected in parallel with the said inductor. Alternatively, the damping element may be a resistor having a value which increases when its temperature increases (a so-called positive temperature coefficient or PTC-resistor), for example, the resistance formed by the filament of an incandescent lamp, this resistor being connected in series with the capacitor of the parallel resonant part of the second) resonant circuit. When using a PTC-resistor, the primary winding of the control-transformer must be connected in series with the inductor in the parallel resonant part of the second resonant circuit.

However, it is generally preferable if the additional reactive element of the second resonant circuit is a capacitor, which is generally less expensive, lighter in weight and less space-consuming than an inductor. If a capacitor is used, the damping element is a PTC-resistor which is connected in series with the capacitor of the parallel resonant part of the second resonant circuit, with the primary winding of the control-transformer being connected in series with the inductor in the parallel resonant part of the second resonant circuit.

The damping resistor generally has a rather low nominal resistance so that, when the inverter is started or switched on, the second resonant circuit is damped relatively slightly and supplies strong control-pulses to the control-electrode of the semiconductor controlled rectifier or rectifiers. Since the damping resistor in the second resonant circuit is connected so that its own frequency and hence also the operating frequency of the inverter increase with the damping of the second resonant circuit, the inverter operates at starting at a relatively low frequency, so that the voltage produced is then also relatively low. The damping resistor is heated by the current circulating in the parallel resonant part of the second resonant circuit or by the voltage across the additional inductor, so that its resistance value increases or decreases (depending on whether it is PTC or NTC) and the operating frequency and the output voltage of the converter increase. This output voltage and hence also the voltage across the second resonant circuit is normally limited by the load current taken from the inverter. If the load circuit is interrupted, or if only a light load is connected to the output of the inverter, the output voltage may attain a value great enough to damage the controlled rectifiers in the inverter.

In accordance with a further aspect of the invention, the production of an excessively high output voltage is prevented by using a second quick-acting damping element which abruptly and very strongly increases the damping of the second resonant circuit with an increasing voltage across said circuit. Such an element may be one, for example, having a resistance value which abruptly and strongly decreases with an increasing voltage across the element; it may be formed by a pair of Zener diodes connected back-to-back or by a plurality of back-to-back pairs of Zener diodes connected in series with each other. The very high resistance value of the element thus formed becomes abruptly very low when the voltage across the element exceeds the sum of the Zener breakdown voltages of the diode or diodes connected in the cut-off direction. The second damping element may also be a voltage-dependent resistor (VDR).

The second damping element may be connected in parallel with the parallel resonant part of the second resonant circuit or with the additional reactive element thereof. However, it is particularly efficacious to connect it in parallel with a first damping resistor having a resistance value which increases strongly with its temperature or with the additional reactive element of the second resonant circuit, if said additional reactive element is a capacitor. According to another feature of the invention, the second damping element may also consist of two parts, one of which is connected in parallel with the damping resistor and the other in parallel with the additional capacitor of the second resonant circuit.

In an inverter whose second resonant circuit includes one or more second damping elements as above noted, the following will occur: when the output voltage increases above a given value, the voltage across the second resonant circuit attains a value at which the resistance of the second damping element abruptly becomes so small that the influence of this element on the operation of the second resonant circuit and the inverter prevails over the effect of the damping resistor; even if this effect is not felt in full, the decrease in the resistance of the second damping element compensates the effect of a further variation in the resistance of the damping resistor. The increase in the operating frequency and the output voltage of the inverter with the variation in the resistance of the damping resistor are thus limited by the abrupt decrease in the resistance of the second damping element.

In most cases the primary winding of the control transformer may be connected in series with the capacitor of the parallel resonant part of the second resonant circuit and the damping resistor or with the inductor of said parallel resonant part. Since this primary winding constitutes an inductive impedance, it is preferably connected in series with the inductor of said parallel resonant part, since it might otherwise be the cause of parasitic oscillations of comparatively very high frequency in the second resonant circuit, particularly if the additional reactive element is a capacitor.

The above objects and features of the invention, as well as others, will be more fully understood from the following description taken in conjunction with the accompanying drawing, wherein:

FIG. 2 shows another embodiment of a second resonant circuit.

Figure 1:
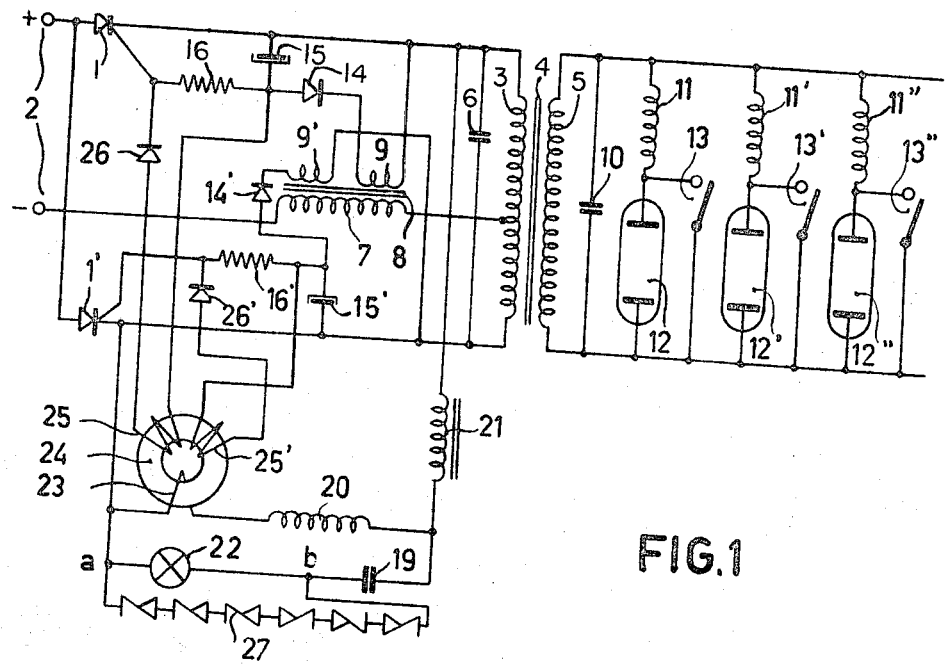
FIG. 1 is a schematic circuit diagram of an embodiment of an inverter according to the invention.

In the embodiment of the invention shown in FIG. 1, two semiconductor controlled rectifiers 1 and 1' have their cathode and anode electrodes connected to the respective terminals of a supply source 2 as shown. The two anodes are directly connected to the positive terminal of said source and each cathode is connected to the negative terminal through a corresponding half of a primary winding 3 of an output transformer 3–5 and an inductor 7. A capacitor 6 is connected across the winding 3 and constitutes, with the winding 3, the capacitive part of a resonant circuit 3, 6, 7 having series resonance properties; the load 10–13, connected to the secondary winding 5 of the output transformer, is coupled with said capacitive part by virtue of the coupling between the primary and secondary windings. The load 10–13 consists of the parallel combination of a plurality of luminescent gas discharge tubes 12, 12', 12" . . . each connected in series with a series inductance 11, 11', 11" . . . and a capacitor 10 . . . , the latter serving to tune the parallel combination substantially to the operating frequency of the converter and thus compensating for the inductive character of the series combination 11, 12. In parallel with each of the tubes 12, 12', 12" . . . there is connected a short-circuit switch 13, 13', 13" . . . , so that the corresponding tube can be put out of operation without having an adverse effect on the natural frequency of the series resonant circuit 3, 6, 7 and hence on the duration of each conducting period of each rectifier 1, 1'.

The inductor 7 has a core 8 of ferromagnetic material, on which two secondary windings 9 and 9' are arranged. With each current pulse across one or the other of the rectifiers 1 and 1' a voltage pulse is produced across each of the windings 9 and 9'. A capacitor 15 or 15' is charged through a rectifier 14 or 14' respectively by said voltage pulse and the direct voltage across each of these capacitors serves as a reverse bias voltage for the control electrodes of the corresponding rectifier 1 and 1' respectively, connected thereto through resistors 16 and 16', respectively. Since the windings 9 and 9' are coupled with the winding 7, so that a current pulse flows during each conducting period of each of the rectifiers 1 and 1' and also when the inverter is switched on, the reverse bias voltage across the capacitors 15 and 15' is operative immediately after switching on and protects the inverter from undesirable ignitions or re-ignitions of the rectifiers 1 and 1' which might otherwise be brought about by comparatively low interference voltage, particularly by interference voltages produced by the inverter itself.

In order to obtain the ignition of one of the rectifiers 1 and 1' when the inverter is switched on, a first current pulse is passed through one of the windings of the core 24; this can be done, for example, by means of a capacitor, shunted by a resistor and connected between the anode and the cathode of the rectifier 1 or 2.

The rectifiers 1 and 1' are periodically rendered alternately conducting by a pulse produced under the control of the current through a second resonant circuit coupled with the capacitive part 3, 6 of the resonant circuit 3, 6 7. This second resonant circuit comprises a parallel resonant circuit consisting of a first capacitor 19 and a first inductor 20, a third active element 21 connected in series with the parallel resonant circuit 19, 20, a first resistor 22 connected in series with the first capacitor 19 (acting to undercritically damp the second resonant circuit) and the primary winding 23 of a control-transformer 23, 24, 25, 25'. The control-transformer operates as a non-linear element and core 24 thereof is a saturable core of ferromagnetic material. The primary winding 23 is connected in series with one of the two reactive elements 19 and 20.

Just after the zero passage of the current through the primary winding 23 and the series-connected inductor 20, the core 24 of the control-transformer changes over from one saturation state to the opposite saturation state, and thus produces a control-pulse across one of the secondary windings 25, 25' of the control-transformer; these secondary windings are coupled with the circuit between the cathode and the control-electrode of the rectifiers 1 and 1' respectively. The windings 25 and 25' are connected via rectifiers 26 and 26' respectively to the resistors 16 and 16' respectively. The rectifiers 26 and 26' allow only forward current pulses to pass to the control-electrode of the corresponding rectifier 1 or 1' and the windings 25 and 25' are wound with opposite senses so that, when a forward current pulse produced for example in the winding 25 flows to the control-electrode of the rectifier 1 through the rectifier 26 owing to the change-over of the core 24, a reverse pulse is produced across the winding 25' and this reverse pulse cannot reach the control-electrode of the rectifier 1', due to the polarity of the rectifier 26'.

Figures 3, 4:
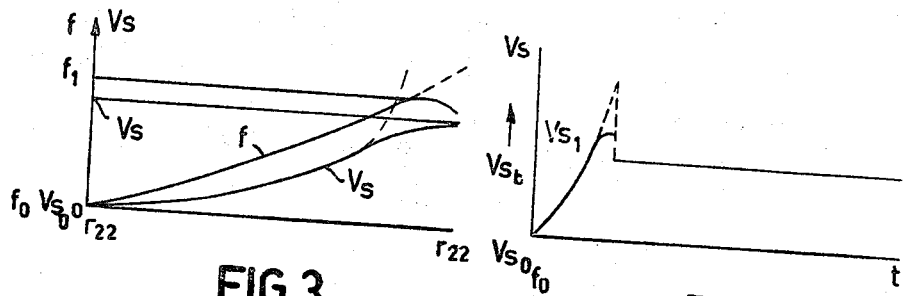
FIGS. 3 and 4 are graphs illustrating the improved operation of the inverters according to the invention.

The second resonant circuit 19–23 is excited by each current pulse through the resonant circuit 3, 6, 7 and the values of its reactive elements 19, 20, 21, 23 and of its resistive element 22 in combination are mainly determinative of the switching frequency and hence the operating frequency of the inverter with a given supply voltage and a given load. The curves $f$ and $V_s$ of FIG. 3 represent the variation in operating frequency and output voltage respectively with respect to the value of the damping resistor 22. It can be seen from these curves that the operating frequency of the inverter increases with the value of the damping resistor 22; the output voltage also increases in like manner and the effect here is even more pronounced as shown by the dotted-line portions of the curves. The curves assume, of course, a given value of the source of supply voltage 2 and the load.

In accordance with a feature of the invention, the second resonant circuit 19–23 also includes a second damping element 27 having a resistance value which drops considerably with an increase in voltage across it, while the damping resistor 22 is a resistor having a value which increases strongly with temperature. The second damping element 27 is illustrated in FIG. 1 as consisting of the series combination of several pairs of Zener diodes connected in series with each other, each pair of diodes being connected with opposite pass directions, i.e., back-to-back. This, however, is illustrative of only one form that the damping element may take; it may, for example, also be constituted by a different voltage-dependent resistor, for example, a VDR. The damping resistor 22 is shown in the form of an incandescent lamp, but it may also be formed by a different resistor having a high positive temperature coefficient, for example, a so-called PTC-resistor.

When the inverter shown is switched on by connecting it to the source 2, a strong current pulse is produced through the inductor 7 and the upper half of the winding 3. This current pulse produces a voltage pulse across said upper half of the winding 3 and a voltage pulse of double this amplitude across the whole winding 3 and the second resonant circuit 19, 20, 22, 23, 27, connected in parallel therewith. The parallel resonant circuit 19, 20, 22, 23, 27 is thus strongly excited and the core 24 is brought to the corresponding saturation state. The total resistance value of the parallel combination of the damping elements 22 and 27 is very low, so that the second resonant circuit is damped very undercritically and continues oscillating. Shortly after the first passage through zero of the corresponding circulating current through the inductor 20 and the winding 23, the core 24 changes over from the saturation state to which it was previously brought to the opposite saturation state and thus produces a forward current pulse through the secondary winding 25'. This pulse reaches the control-electrode of the rectifier 1' via the rectifier 26'; the rectifier 1' is thus rendered conducting even though the two rectifiers 1 and 1' have already been polarized in the reverse direction by the starting pulse by means of the windings 9 and 9' respectively and of the rectifiers 14 and 14' respectively.

Owing to the conducting state of the rectifier 1', the second resonant circuit 19, 20, 22, 23, 27 is re-excited strongly and substantially in phase, so that at the first-following passage through zero of the current through the inductor 20 of the parallel resonant circuit 19, 20, 22, 23, 27 the core 24 returns to its first saturation state and thus produces a forward current pulse through the secondary winding 25, which pulse reaches the control-electrode of the rectifier 1 via the rectifier 26; the rectifier 1 thus being rendered conducting.

The filament wire of the incandescent lamp 22 is heated by the circulating current of the parallel resonant circuit 19, 20, 22, 23, 27 and its resistance value increases considerably. Thus the voltage $V_s$ across the secondary winding 5 of the output transformer 3–5 increases in frequency and even more strongly in amplitude, while the luminescent tubes 12, 12', 12" . . . of the load are ignited. After a few tenths of a second this voltage would attain a value which might be dangerous for the inverter itself and particularly for its semiconductor controlled rectifiers 1 and 1'. However, with the circuit of FIG. 1, prior thereto the voltage across the incandescent lamp 22 exceeds the voltage to which the second damping element 27 responds, i.e., the sum of the Zener break-down voltages of the series-connected diode pairs. As is illustrated by the full curves of FIG. 3, the operating frequency of the inverter is thus limited to a value $f_1$, which drops with a further increase in resistance value of the filament wire of the incandescent lamp 22, while the output voltage $V_s$ tends to reach a value $V_{s1}$, which slightly exceeds that corresponding to the voltage to which the second damping element responds. The output voltage $V_{s1}$ produced is then maintained until all luminescent tubes 12, 12', 12" . . . have been ignited or until the load of the inverter has become sufficiently high, after which the voltage attains the operation value $V_{sb}$ (FIG. 4).

If the damping resistor 22 were a resistor having a constant resistance value, the output voltage of the inverter would step up to inadmissibly high values within a few milliseconds immediately after the start, with a comparatively high frequency. This would also be true if the resistor were formed by the filament wire of an incandescent lamp as in the embodiment described above but connected in a manner such that it would cause a damping effect strongly increasing with its temperature with a corresponding diminution of the natural frequency of the second resonant circuit.

If one or more of the tubes 12, 12' 12" . . . is switched out or short-circuited, the output voltage $V_s$ will increase again, but it cannot exceed $V_{s1}$, since then the second damping element 27 responds immediately and counteracts any further increase in voltage. Consequently, the circuit arrangement described allows a very satisfactory start of the inverter with a very small damping of its second resonant circuit, while the inverter is at the same time protected from excess voltages.

Figure 2:
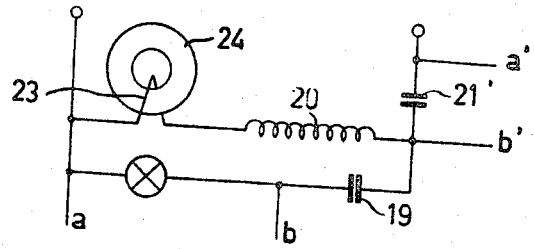
FIG. 2 is a schematic circuit diagram of a portion of another embodiment of the invention; specifically.

FIG. 2 shows another embodiment of a circuit arrangement according to the invention, wherein the third reactance of the second resonant circuit is a capacitor 21' instead of an inductor as shown in FIG. 1. Only that part of the circuit which is different from that of FIG. 1 is shown in FIG. 2; it should be understood that all other elements in FIG. 2 are the same in structure and interrelationship as the circuit of FIG. 1. The use of a capacitor provides considerable savings in weight and space. The inverter of FIG. 1 will thus be lower in weight, smaller and less expensive; moreover, it is much more difficult to manufacture inductors having a satisfactory linear characteristic curve and reasonable dimensions than it is to manufacture capacitors.

If the third reactive element of the second resonant circuit is a capacitor 21' as shown in FIG. 2, the second damping element 27 may be connected in parallel with the first damping resistor 22 across points a and b similar to the manner shown in FIG. 1, or in parallel with the third reactive element 21' across points a' and b'. In the former case a third damping element may be connected in parallel with the third reactive element 21' across points a' and b'. In this manner, the frequency and voltage inhibition can be made still more abrupt, so that a very effective voltage limitation can be obtained even with a second damping element which does not respond to a given voltage.

In a practical embodiment of an inverter as shown in FIG. 2, the various elements of the following types and values were used:

Semiconductor controlled rectifiers 1, 1': Philips type BTX 19.
Supply voltage 2: 80 to 120 v., nominal value 100 v.
Transformer 3–5: 2 x 23 turns for the primary winding, 64 turns for the secondary winding on a ferroxcube core having a section of 12 cm.$^2$; airgap of 0.9 mm.
Capacitor 6: 1.7 µf.
Inductor 7: 80 µh, 25 turns on a ferroxcube core having a section of 2 cm.$^2$, secondary windings 9 and 9' of one turn each.
Capacitor 10: 0.13 µf.
Inductors 11, 11', etc.: 16 mh.; 420 turns of ferroxcube core having a section of 1 cm.$^2$; airgap of 4 mms.
Luminescent tubes 12, 12', etc.: 24 tubes, 40 w. each.
Rectifiers 14, 14': Philips type OA 214.
Capacitors 15, 15': 0.33 µf.
Resistors 16, 16': 200 Ohms.
Capacitor 19: 0.46 µf.
Inductor 20: 1.5 mh.
Capacitor 21: 0.082 µf.
Damping resistor 22: 55 v./50 w.
Control transformer 23, 24, 25, 25': primary winding 20 turns and 2 windings of 15 turns each on a ferroxcube core having a section of 0.1 cm.$^2$.
Rectifiers 26, 26': Philips type OA 214.
Damping element 27: 3 x 2 Zener diodes, Philips type BZZ 17.

The operating frequency was 5500 c./s. at the start and increased to 6800 c./s. The losses in the incandescent lamp 22 amounted to about 13 w. with a nominal supply voltage and at full load. With a reverse bias voltage of 1 v. across capacitors 15 and 15' and a supply voltage of 80 v. the control-pulses and an amplitude exceeding 5 v. for 5 µsec. with zero current and more than 2 v. for 5 µsec. with a current of 125 ma., so that at an ambient temperature of 25° C. the inverter could be satisfactorily started with a supply voltage of not more than 58 v.

With full load the output voltage $V_s$ was equal to 250 v. and increased to 256, 263, 269 and 320 v. respectively with a shortcircuit of 2, 4, 6 and 18 respectively of the 24 discharge tubes 12, 12', etc., while the recovery time remaining available between the extinction of one of the rectifiers 1, 1' and the ignition of the other was always longer than 20 µsec. under all conditions and even with the lowest starting and/or operational frequency.

While the invention has been described with respect to specific embodiments, various changes and modifications thereof will readily occur to those skilled in the art without departing from the inventive concept, the scope of which is set forth in the appended claims.

It is also to be understood that all quantitative examples given, and especially the quantitative values given in the above-noted practical embodiment, are provided only to enable ready practice of the invention and to illustrate an embodiment thereof and are not meant to limit the scope of the invention in any manner except as defined in the appended claims.

What I claim is:

1. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a third reactive element connected in series with the parallel resonant circuit, at least one damping resistor undercritically damping said second resonant circuit, and the primary winding of a control transformer, said control transformer having a saturable core of ferromagnetic material on which said primary winding and at least one secondary winding are wound, said primary winding being connected in series with one of the reactive elements in said parallel resonant circuit, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being substantially determined by said reactive and resistive elements of said second resonant circuit, said damping resistor having a resistance which varies sharply with its temperature and acting to sharply increase the damping of said second resonant circuit and to increase the operating frequency of the inverter in response to a change in its temperature.

2. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a second inductor connected in series with the parallel resonant circuit, at least one damping resistor connected in parallel with said second inductor and undercritically damping said second resonant circuit, and the primary winding of a control transformer, said control transformer having a saturable core of ferromagnetic material on which said primary winding and at least one secondary winding are wound, said primary winding being connected in series with one of the reactive elements in said parallel resonant circuit, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being substantially determined by said reactive and resistive elements of said second resonant circuit, said damping resistor having a resistance which sharply decreases with an increase in its temperature and acting to sharply increase the damping of said second resonant circuit and to increase the operating frequency of the inverter in response to a change in its temperature.

3. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a third reactive element connected in series with the parallel resonant circuit, at least one damping resistor connected in series with said first capacitor and undercritically damping said second resonant circuit, and the primary winding of a control transformer, said control transformer having a saturable core of ferromagnetic material on which said primary winding and at least one secondary winding are wound, said primary winding being connected in series with said first inductor, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being determined mainly by said reactive and resistive elements of the second resonant circuit, said damping resistor having a resistance which sharply increases with an increase in its temperature and acting to sharply increase the damping of said second resonant circuit and to increase the operating frequency of the inverter in response to a change in its temperature.

4. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a third reactive element connected in series with the parallel resonant circuit, a first damping element comprising at least one damping resistor undercritically damping said second resonant circuit, a rapid-acting second damping element and the primary winding of a control transformer, said control transformer having a saturable core of ferromagnetic material on which said primary winding and at least one secondary winding are wound, said primary winding being connected in series with one of the reactive elements in said parallel resonant circuit, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being determined mainly by said reactive and resistive elements of the second resonant circuit, said damping resistor having a resistance which varies sharply with its temperature and acting to sharply increase the damping of said second resonant circuit and to increase the operating frequency of the inverter in response to a change in its temperature, said second damping element being responsive to the voltage across said second resonant circuit and acting to increase the damping thereof in response to an increase in voltage across said circuit.

5. An inverter as recited in claim 4, wherein the second damping element is connected in parallel with the first damping element.

6. An inverter as recited in claim 4, wherein said second damping element has a resistance value which abruptly decreases in response to a predetermined increase in the voltage across it.

7. An inverter as recited in claim 6, wherein the second damping element is connected in parallel with the first damping element.

8. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said resonant circuit, said second resonant circuit including a parallel resonant circuit comprising a first capacitor and a first inductor, a third reactive element connected in series with the parallel resonant circuit, a first damping element comprising at least one damping resistor connected in series with said first capacitor and undercritically damping said second resonant circuit, a second damping element, and the primary winding of a control transformer, said control transformer having a saturable core of ferromagnetic material on which said primary winding and at least one secondary winding are wound, said primary winding being connected in series with said first inductor, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being determined mainly by said reactive and resistive elements of the second resonant circuit, said damping resistor having a resistance which sharply increases with an increase in its temperature and acting to sharply increase the damping of said second resonant circuit and to increase the operating frequency of the inverter in response to a change in its temperature, said second damping element being responsive to the voltage across said second resonant circuit and acting to increase the damping thereof in response to an increase in voltage across said circuit.

9. An inverter as recited in claim 8, wherein the second damping element is connected in parallel with the first damping element.

10. An inverter as recited in claim 8, wherein said second damping element has a resistance value which abruptly decreases in response to a predetermined increase in the voltage across it.

11. An inverter as recited in claim 10, wherein the second damping element is connected in parallel with the first damping element.

12. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a third reactive element connected in series with the parallel resonant circuit, a first damping element comprising at least one damping resistor connected in series with said first capacitor and undercritically damping said second resonant circuit, a second damping element connected in parallel with said first damping element, and the primary winding of a control transformer, said control transformer having a saturable core of ferromagnetic material on which said primary winding and at least one second winding are wound, said primary winding being connected in series with said first inductor, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being determined mainly by said reactive and resistive elements of the second resonant circuit, said damping resistor having a resistance which sharply increases with an increase in its temperature and acting to sharply increase the damping of said second resonant circuit and to increase the operating frequency of the inverter in response to a change in its temperature, said second damping element being responsive to the voltage across said second resonant circuit and acting to increase the damping thereof in response to an increase in voltage across said circuit.

13. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a second capacitor connected in series with the parallel resonant circuit, a first damping element comprising at least one damping resistor undercritically damping said second resonant circuit, a rapid-acting second damping element connected in parallel with said second capacitor, and the primary winding of a control transformer, said control transformer having a saturable core of ferromagnetic material on which said primary winding and at least one secondary winding are wound, said primary winding being connected in series with one of the reactive elements in said parallel resonant circuit, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being determined mainly by said reactive and resistive elements of the second resonant circuit, said damping resistor having a resistance which varies sharply with its temperature and acting to sharply increase the damping of said second resonant circuit and to increase the operating frequency of the inverter in response to a change in its temperature, said second damping element being responsive to the voltage across said second resonant circuit and acting to increase the damping thereof in response to an increase in voltage across said circuit.

14. An inverter as recited in claim 13, wherein said second damping element has a resistance which abruptly and sharply decreases with an increase in voltage across said second resonant circuit.

15. An inverter according to claim 13, further including a third damping element connected in parallel with said first damping element, said third damping element having a resistance value which decreases sharply with an increase in the voltage across it.

16. An inverter according to claim 15, wherein said third damping element has a resistance which abruptly and sharply decreases with an increase in voltage across said second resonant circuit.

17. An inverter as claimed in claim 3, wherein said damping resistor has a high positive temperature coefficient of resistance.

18. An inverter as claimed in claim 4, wherein said first damping element comprises at least one damping resistor having a high positive temperature coefficient of resistance.

19. An inverter as claimed in claim 13, wherein said first damping element comprises at least one damping resistor having a high positive temperature coefficient of resistance.

20. An inverter as recited in claim 4, wherein said second damping element comprises at least one pair of diodes connected back-to-back.

21. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a third reactive element connected in series with the parallel resonant circuit, a first damping element comprising at least one damping resistor connected in series with said first capacitor and undercritically damping said second resonant circuit, a second damping element, and the primary winding of a control transformer, said control transformer having a saturable core of ferromagnetic material on which said primary winding and at least one secondary winding are wound, said primary winding connected in series with said first inductor, said secondary winding being coupled to the circuit between the cathode and the control electrode of the controlled rectifier, said saturable core changing over from one saturation state to the opposite saturation state in response to the passage through a zero of the current through said primary winding and producing a pulse through said secondary winding for application to said control electrode, the switching frequency of the inverter being determined mainly by said reactive and resistive elements of the second resonant circuit, said damping resistor having a resistance which sharply increases with an increase in its temperature and acting to sharply increase the damping of said second resonant circuit and to increase the operating frequency of the inverter in response to a change in its temperature, said second damping element consisting of at least one pair of diodes connected back-to-back and being responsive to the voltage across said second resonant circuit, and acting to abruptly decrease its resistance in response to an increase in voltage across said circuit.

22. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a second capacitor connected in series with the parallel resonant circuit, a first damping element comprising at least one damping resistor undercritically damping said second resonant circuit, a rapid-acting second damping element connected in parallel with said second capacitor, and the primary winding of a control transformer, said control transformer having a saturable core of ferromagnetic material on which said primary winding and at least one secondary winding are wound, said primary winding being connected in series with one of the reactive elements in said parallel resonant circuit, said secondary winding being coupled to the circuit between the cathode and the control electrode of the controlled rectifier, said saturable core changing over from one saturation state to the opposite saturation state in response to the passage through a zero of the current through said primary winding and producing a pulse through said secondary winding for application to said control electrode, the switching frequency of the inverter being determined mainly by said reactive and resistive elements of the second resonant circuit, said damping resistor having a resistance which sharply increases with an increase in its temperature and acting to sharply increase the damping of said second resonant circuit and to increase the operating frequency of the inverter in response to a change in its temperature, said second damping element consisting of at least one pair of diodes connected back-to-back and being responsive to the voltage across said second resonant circuit, and acting to abruptly decrease its resistance in response to an increase in voltage across said circuit.

23. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a third reactive element connected in series with the parallel resonant circuit, a first damping element comprising at least one damping resistor connected in series with said first capacitor and undercritically damping said second resonant circuit, a second damping element, and the primary winding of a control transformer, said control transformer having a saturable core of ferromagnetic material on which said primary winding and at least one secondary winding are wound, said primary winding being connected in series with said first inductor, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being determined mainly by said reactive and resistive elements of the second resonant circuit, said damping resistor having a resistance which sharply increases with an increase in its temperature and acting to sharply increase the damping of said second resonant circuit and to increase the operating frequency of the inverter in response to a change in its temperature, said second damping element comprising a voltage-dependent resistor responsive to the voltage across said second resonant circuit and acting to sharply decrease its resistance in response to an increase in voltage across said circuit.

24. A self-generating inverter comprising: at least one semiconductor controlled rectifier having main current circuit electrodes and a control electrode, said main current circuit electrodes being adapted for connection to the respective terminals of a source of direct current supply voltage, a first resonant circuit having series resonance properties, one of the main current circuit electrodes of the controlled rectifier being connected to a corresponding terminal of the supply source through said first resonant circuit, means coupling the capacitive portion of said first resonant circuit with a load circuit, a second resonant circuit connected across said capacitive portion of said first resonant circuit, said second resonant circuit including a parallel resonant circuit comprising a first capacitor and a first inductor, a second capacitor connected in series with the parallel resonant circuit, a first damping element comprising at least one damping resistor undercritically damping said second resonant circuit, a rapid-acting second damping element connected in parallel with said second capacitor, and the primary winding of a control transformer, said control transformer having a saturable core of ferromagnetic material on which said primary winding and at least one secondary winding are wound, said primary winding being connected in series with one of the reactive elements in said parallel resonant circuit, said secondary winding being coupled to the circuit between the cathode and the control electrode of the controlled rectifier, said saturable core changing over from one saturation state to the opposite saturation state in response to the passage through zero of the current through said primary winding and producing a pulse through said secondary winding for application to said control electrode, the switching frequency of the inverter being determined mainly by said reactive and resistive elements of the second resonant circuit, said damping resistor having a resistance which sharply increases with an increase in its temperature and acting to sharply increase the damping of said second resonant circuit and to increase the operating frequency of the inverter in response to a change in its temperature, said second damping element comprising a voltage-dependent resistor responsive to the voltage across said second resonant circuit and acting to sharply decrease its resistance in response to an increase in voltage across said circuit.

References Cited

UNITED STATES PATENTS 3,241,039   3/1966   Wilting _____ 321—45 X
3,248,637   4/1966   Albert et al. _____ 321—18

JOHN F. COUCH, *Primary Examiner.*

W. M. SHOOP, *Assistant Examiner.*